United States Patent
Bronfenbrenner et al.

(10) Patent No.: US 8,765,049 B2
(45) Date of Patent: Jul. 1, 2014

(54) CONTROL OF CLAY CRYSTALLITE SIZE FOR SHRINKAGE MANAGEMENT

(75) Inventors: David J Bronfenbrenner, Painted Post, NY (US); Chris Maxwell, Painted Post, NY (US); Martin Joseph Murtagh, Trumansburg, NY (US); Bryan Ray Wheaton, Painted Post, NY (US)

(73) Assignee: Corning Incorporated, Corning, NY (US)

(*) Notice: Subject to any disclaimer, the term of this patent is extended or adjusted under 35 U.S.C. 154(b) by 156 days.

(21) Appl. No.: 13/459,827

(22) Filed: Apr. 30, 2012

(65) Prior Publication Data

US 2013/0116110 A1  May 9, 2013

Related U.S. Application Data

(63) Continuation-in-part of application No. 13/291,554, filed on Nov. 8, 2011, now abandoned.

(51) Int. Cl.
| | |
|---|---|
| *C04B 33/00* | (2006.01) |
| *C04B 33/24* | (2006.01) |
| *B28B 1/00* | (2006.01) |
| *B28B 3/00* | (2006.01) |
| *C04B 35/185* | (2006.01) |
| *C04B 35/195* | (2006.01) |

(52) U.S. Cl.
CPC ....... *C04B 35/185* (2013.01); *C04B 2235/3463* (2013.01); *C04B 2235/349* (2013.01); *C04B 2235/5445* (2013.01); *C04B 2235/3217* (2013.01); *C04B 2235/3418* (2013.01); *C04B 2235/9615* (2013.01); *C04B 2235/5292* (2013.01); *C04B 2235/80* (2013.01); *C04B 2235/3481* (2013.01); *C04B 35/195* (2013.01); *C04B 2235/9607* (2013.01); *C04B 2235/6021* (2013.01); *C04B 2235/5454* (2013.01)
USPC ........... 264/609; 264/679; 264/680; 501/141; 501/144

(58) Field of Classification Search
USPC .......... 501/141, 144; 264/430, 434, 603, 609, 264/679, 680
See application file for complete search history.

(56) References Cited

U.S. PATENT DOCUMENTS

| | | | |
|---|---|---|---|
| 4,001,028 A | 1/1977 | Frost et al. | 106/62 |
| 5,911,941 A * | 6/1999 | Rokhvarger et al. | 264/432 |
| 5,916,511 A | 6/1999 | Kotani et al. | 264/631 |
| 6,203,882 B1 | 3/2001 | Koike et al. | 428/116 |

(Continued)

FOREIGN PATENT DOCUMENTS

EP 0506301 9/1992

OTHER PUBLICATIONS

Cozzi et al. Crystallite size of kaolinites as indicator of different geochemical types of bauxite. Z Kristallogr Suppl. 30 (2009) 441-446.*

(Continued)

*Primary Examiner* — Noah Wiese
(74) *Attorney, Agent, or Firm* — Charles A. Greene; Matthew J. Mason (57) ABSTRACT

A method of making ceramic articles includes compounding ceramic precursor batch components that include hydrous clay. The hydrous clay includes particle components having a platy geometry. The crystallite size of the platy hydrous clay particle components is greater than a predetermined amount. Controlling such crystallite size can result in reduced shrinkage of green ware during the clay dehydroxylation stage of firing.

17 Claims, 4 Drawing Sheets

(56) References Cited

U.S. PATENT DOCUMENTS

| | | | |
|---|---|---|---|
| 6,501,934 B1 * | 12/2002 | Ahuja et al. | 399/307 |
| 7,481,962 B2 | 1/2009 | Kotani et al. | 264/631 |
| 8,058,198 B2 | 11/2011 | Yamazaki et al. | 501/118 |
| 2005/0221053 A1 | 10/2005 | Tomita et al. | 428/116 |
| 2009/0298670 A1 | 12/2009 | Murtagh et al. | 501/80 |
| 2010/0304082 A1 | 12/2010 | Merkel | 428/116 |

OTHER PUBLICATIONS

G. Cozzi et al: "Crystallite size of kaolinites as indicator of difference geochemical types of bauxite" Zeitschrift fur Kristallographie Supplements, vol. 2009 No. 30 Sep. 1, 2009 pp. 441-446, XP055057380.

International Search Report, Apr. 23, 2013.

JI Langford and AJC Wilson, Scherrer after sixty years: a survey and some new results in the determination of crystallite size, J. Appl. Cryst. 11 (1978) pp. 102-113.

Sucha V. et al, Crystallite Size Distribution of Kaolin Minerals, Per. Mineral 68 (1) 81-92 1999.

P. De Souza Santos, "The use of clay particle morphology studies to characterize industrial clay deposits: examples from Brazil", Clay Minerals, 1993, 28, 539-553.

* cited by examiner

CONTROL OF CLAY CRYSTALLITE SIZE FOR SHRINKAGE MANAGEMENT

CROSS-REFERENCE TO RELATED APPLICATIONS

This is a continuation-in-part of U.S. patent application Ser. No. 13/291,554 filed on Nov. 8, 2011 now abandoned, the content of which is relied upon and incorporated herein by reference in its entirety, and the benefit of priority under 35 U.S.C. §120 is hereby claimed.

BACKGROUND

The disclosure relates generally to hydrous clay containing green monoliths and more specifically to hydrous clay containing green monoliths that can exhibit reduced shrinkage during firing.

In the formation of ceramic bodies, e.g., silicon carbide, cordierite, mullite, alumina, or aluminum titanate bodies, green monoliths are typically fired at high temperatures for an extended period of time. During firing, the green bodies often experience one or more shrinkage events. For example, during the firing of hydrous clay containing green monoliths, the bodies often shrink during a time (and temperature) in the firing cycle that corresponds to a clay dehydroxylation event. Such shrinking can lead to the formation of cracks and other undesirable defects in the resulting ceramic articles.

Various methods have been employed to control the shrinkage of such hydrous clay containing green monoliths. One method, such as that described in U.S. Pat. No. 4,001,028, involves simply reducing the amount of hydrous clay in the batch composition. However, reducing the amount of hydrous clay can lead to certain potential disadvantages, such as creating a less plastic batch material—that is more difficult to extrude and/or undesirable changes with respect to the properties of the fired ceramic body.

Other methods have involved characterizing the clay morphology using an analytical technique, correlating such characterization with a desired characteristic, and then selecting clay that will help enable the resulting composition to exhibit the desired characteristic. For example, U.S. Pat. No. 7,481,962, discloses an analytical technique for determining a clay "cleavage index" and then setting a limit on that index for clay used in a composite batch composition.

SUMMARY

One embodiment of the disclosure relates to a method of making a ceramic article. The method includes compounding ceramic precursor batch components. The ceramic precursor batch components include hydrous clay, wherein the hydrous clay includes particle components having a platy geometry, wherein the crystallite size of the particle components having a platy geometry is greater than a predetermined amount.

Another embodiment of the disclosure relates to a ceramic precursor batch composition. The ceramic precursor batch composition includes ceramic precursor batch components. The ceramic precursor batch components include hydrous clay, wherein the hydrous clay includes particle components having a platy geometry, wherein the crystallite size of the particle components having a platy geometry is greater than a predetermined amount.

Another embodiment of the disclosure relates to a green cellular ceramic body. The green cellular ceramic body includes ceramic precursor batch components. The ceramic precursor batch components include hydrous clay, wherein the hydrous clay includes particle components having a platy geometry, wherein the crystallite size of the particle components having a platy geometry is greater than a predetermined amount.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Various embodiments of the disclosure will be described in detail with reference to the drawings, if any.

As used herein, the term "platy geometry" refers to the geometry of hydrous clay components having dimensions extending in the x, y, and z directions of a Cartesian coordinate system, wherein the z direction the shortest of the three dimensions to which the hydrous clay components extend and is also referred to herein as the "basal plane direction."

Figure 1:
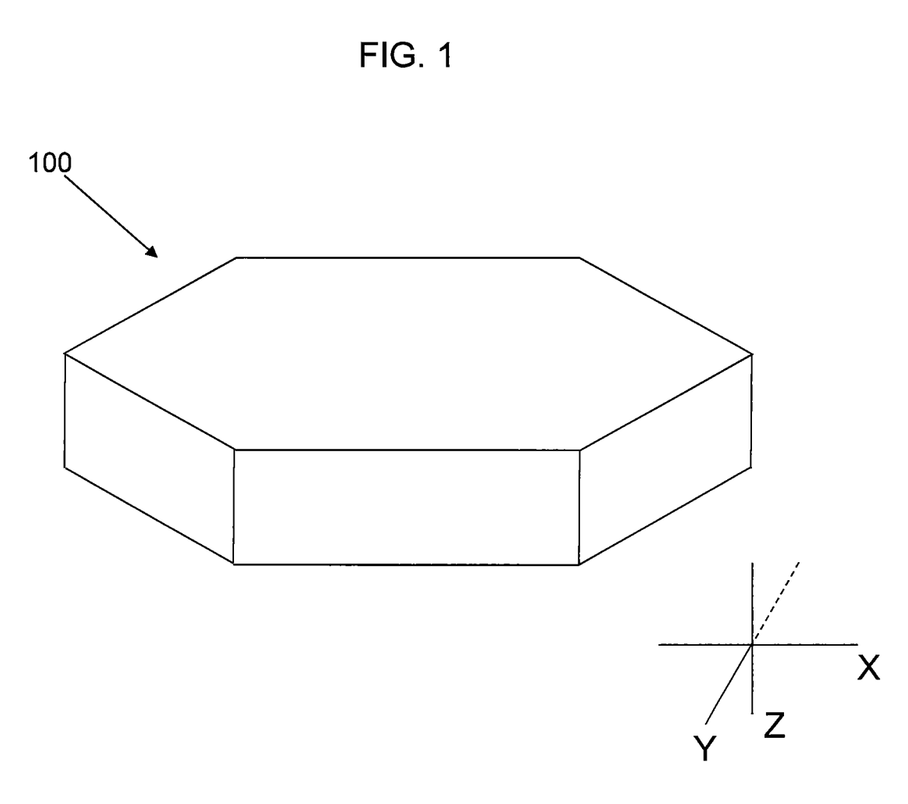
FIG. 1 illustrates a representation of a hydrous clay component having a platy geometry.

A representation of a hydrous clay component having a platy geometry is illustrated in FIG. 1. Hydrous clay component 100 extends in the x, y, and z directions, wherein the z direction is the basal plane direction. As used herein, the shortest dimension that the hydrous clay component extends in the basal plane direction is referred to as the "crystallite size" of the hydrous clay component.

As used herein, the term "shrinkage upon firing" refers to the percent dimensional change of a body as a result of at least a portion of a firing cycle. For example, in the case of a cylindrically shaped body, shrinkage upon firing is represented mathematically as:

$$\frac{\text{Change in axial length upon firing }(\Delta L)}{\text{axial length prior to firing }(L)}$$

Shrinkage upon firing between two stated temperatures refers to the above-described shrinkage of a body during the portion of a firing cycle when the temperature in the firing environment is increased from the first stated temperature to the second stated temperature. For example, a shrinkage upon firing between 400 and 500° C. refers to the above-described shrinkage of the body during the portion of a firing cycle when the temperature in the firing environment is increased from 400° C. to 500° C.

In contrast to other efforts, such as those described in U.S. Pat. No. 7,481,962, which focus on the overall shape of kaolin clay particles, the present application focuses on the crystallite size of clay particle components. Applicants have surprisingly found that the crystallite size of clay particle components correlates well to shrinkage upon firing, particularly during clay dehydroxylation, whereas methods that focus on the overall shape of clay particles do not correlate as well to such shrinkage. Minimizing such shrinkage can, in turn, help to overcome certain problems that can occur during firing, such at the formation of cracks and other undesirable defects in the resulting ceramic articles. Such may also enable faster firing cycles, which can, in turn, enable greater product throughput and greater manufacturing asset utilization.

The crystallite size of clay particle components having a platy geometry as described herein and as observed by FESEM imaging was determined quantitatively by X-ray diffraction measurements of the peak broadening associated with the 00 basal-plane, specifically the (002), reflections. The full width at half maximum (FWHM) was calculated utilizing pseudo-Voight profiles and linear background on standard back-loaded kaolinite powders with the use of MDI Jade profile fitting software. The calculation of the crystallite size is based on the Scherrer (1,2) equation, where XRD peak width is inversely proportional to the crystallite size.

The crystallite size of the clay particle components having a platy geometry should be greater than a predetermined amount. In certain exemplary embodiments, the crystallite size of the clay particle components is greater than 80 nanometers, such as greater than 85 nanometers, and further such as greater than 90 nanometers, and still yet further such as greater than 100 nanometers. The crystallite size of the clay particle components may, for example, be from 80 nanometers to 200 nanometers, such as from 85 nanometers to 150 nanometers, and further such as from 90 nanometers to 120 nanometers.

In certain exemplary embodiments, the hydrous clay consists essentially of particle components having a platy geometry, wherein the crystallite size of the particle components having a platy geometry is greater than the predetermined amount. In certain exemplary embodiments, the hydrous clay consists essentially of particle components having a crystallite size that is greater than 80 nanometers, such as greater than 85 nanometers, and further such as greater than 90 nanometers, and still yet further such as greater than 100 nanometers.

In certain exemplary embodiments, at least 90%, such as at least 95% of the hydrous clay particle components have a platy geometry, wherein the crystallite size of the particle components having a platy geometry is greater than the predetermined amount. In certain exemplary embodiments, essentially all of the hydrous clay particle components have a platy geometry, wherein the crystallite size of the particle components having a platy geometry is greater than the predetermined amount. The predetermined amount can, for example, be at least 80 nanometers.

The hydrous clay can be compounded with other ceramic precursor batch components. Such components may be synthetically produced materials such as oxides, hydroxides, etc., or they may be naturally occurring minerals such as clays (in addition to the hydrous clay), talcs, or any combination of these. Embodiments disclosed herein are not limited to the types of powders or raw materials used as the other ceramic precursor batch components. These may be chosen depending on the properties desired in the ceramic body.

In certain exemplary embodiments, the ceramic precursor batch components comprise at least 10% hydrous clay by weight, such as at least 15% hydrous clay by weight, and further such as at least 20% hydrous clay by weight. For example, the ceramic precursor batch components may, in certain embodiments, comprise from about 10% to about 20% hydrous clay by weight.

In one set of exemplary embodiments, the inorganic ceramic-forming ingredients may yield a cordierite ceramic material upon firing. In other exemplary embodiments, the inorganic ceramic-forming ingredients may be those that yield cordierite-mullite mixtures, some examples of such mixtures being about 2% to about 60% mullite, and about 30% to about 97% cordierite, with allowance for other phases, typically up to about 10% by weight.

One composition, by way of a non-limiting example, which ultimately forms cordierite upon firing is as follows in percent by weight: about 10-20, such as about 12-18 of hydrous clay, about 15-25, such as about 18-22 of calcined clay, about 35-45, such as about 38-42 of talc, about 5-15, such as about 8-12 of alumina, and about 5-15, such as about 8-12 of silica.

In certain exemplary embodiments, methods disclosed herein include determining the crystallite size of hydrous clay particle components having a platy geometry prior to compounding the clay with other ceramic precursor batch components. In such methods, if the crystallite size of the particle components having a platy geometry is determined to be below a predetermined amount, additional particle components having a platy geometry and a crystallite size that is some amount higher than the predetermined amount can be compounded into the composition, such that, collectively, the particle components having a platy geometry have a crystallite size that is greater than a predetermined amount.

For example, if the predetermined amount of crystallite size of the hydrous clay particle components is 80 nanometers, and a crystallite size of hydrous clay particle components of a tested amount or lot of hydrous clay is 60 nanometers, such clay can be compounded with an amount hydrous clay from a different lot having a crystallite size of above 80 nanometers (for example, 100 nanometers) such that the resulting combined amounts from both lots have a crystallite size of above 80 nanometers.

In certain exemplary embodiments, the ceramic precursor batch composition comprises one or more organic ceramic-forming ingredients, such as ingredients that can be used as binders, lubricants and/or surfactants. Examples of binders include cellulose-based polymers, such as hydroxypropyl methylcellulose (HPMC). Examples of lubricants/surfactants include natural or synthetic oils, silicone-based materials, $C_8$ to $C_{22}$ fatty acids (and their salts), $C_8$ to $C_{22}$ fatty alcohols, and $C_8$ to $C_{22}$ fatty esters.

Typically the amount of binder may be from about 1% to about 10% by weight, such as from about 2% to about 5% by weight, on a weight percent by super addition basis. Typically, the amount of lubricants or surfactants may be from about 1% by weight to about 10% by weight, such as from about 3% to about 6% by weight, on a weight percent by super addition basis.

Compositions disclosed herein can also include at least one solvent. The solvent may provide a medium for the binder to dissolve in thus providing plasticity to the ceramic precursor batch and wetting of the powders. The solvent may be aqueous based such as, but not limited to, water or water-miscible solvents. Most useful may be aqueous based solvents which provide hydration of the binder and powder particles. Typically, the amount of aqueous solvent may be from about 10% by weight to about 50% by weight, on a weight percent by super addition basis.

Non-limiting examples of oil lubricants may be light mineral oil, corn oil, high molecular weight polybutenes, polyol esters, a blend of light mineral oil and wax emulsion, a blend of paraffin wax in corn oil, and combinations of these. Typically, the amount of oil lubricants may be from about 1% by weight to about 10% by weight, on a weight percent by super addition basis. In an exemplary embodiment, the oil lubricants may be present from about 3% by weight to about 6% by weight, on a weight percent by super addition basis.

In filter applications, such as in diesel particulate filters, it may be desirable to include a pore forming material in the mixture in an amount effective to subsequently obtain the porosity required for efficient filtering. Examples of pore forming materials include particulate substances (not binders) that burn out of the green body in the firing step. Other pore forming materials do not burn out in the firing step. Some types of pore forming materials that may be used, although it is to be understood that embodiments herein are not limited to these, include non-waxy organics that are solid at room temperature, elemental carbon, and combinations of these. Some examples may be graphite, starch, cellulose, flour, etc. In one exemplary embodiment, the pore forming material may be elemental carbon. In another exemplary embodiment, the pore forming material may be graphite, which may have the least adverse effect on the processing. In an extrusion process, for example, the rheology of the mixture may be good when graphite is used. The pore forming material may be up to about 60% by weight as a superaddition. Typically, the amount of graphite may be from about 1% to about 50%, such as from about 3% to about 30% by weight based on the inorganic ceramic-forming ingredients. If a combination of graphite and flour are used, the amount of pore forming material may be typically from about 1% by weight to about 25% by weight with the graphite at 5% by weight to 10% of each and the flour at 5% by weight to about 10% by weight.

The disclosure also provides a method of producing a ceramic article, comprising the steps of compounding ceramic precursor batch components, including hydrous clay, wherein the hydrous clay comprises particle components having a platy geometry, wherein the crystallite size of the particle components having a platy geometry is greater than a predetermined amount. The ingredients may be compounded by being mixed, for example, in a muller or plow blade mixer. A solvent may be added in an amount that is less than is needed to plasticize the batch. With water as the solvent, the water hydrates the binder and the powder particles. The surfactant and/or lubricant, if desired, may then be added to the mix to wet out the binder and powder particles.

The precursor batch may then be plasticized by shearing the wet mix formed above in any suitable mixer in which the batch will be plasticized, such as, but not limited to, a twin-screw extruder/mixer, auger mixer, muller mixer, or double arm, etc. Extent of plasticization is dependent on the concentration of the components (binder, solvent, surfactant, oil lubricant and the inorganics), temperature of the components, the amount of work put in to the batch, the shear rate, and extrusion velocity. During plasticization, the binder dissolves in the solvent and a high viscosity fluid phase is formed. The binder formed is stiff because the system is very solvent-deficient. The surfactant enables the binder phase to adhere to the powder particles.

In a further step, the composition may be extruded to form a green honeycomb body. Extrusion may be done with devices that provide low to moderate shear. For example hydraulic ram extrusion press or two stage de-airing single auger are low shear devices. A single or twin screw extruder is a moderate shear device. The extrusion may be vertical or horizontal.

It will be appreciated that honeycomb bodies disclosed herein may have any convenient size and shape and the disclosed embodiments are applicable to all processes in which plastic powder mixtures are shaped. The process may be especially suited to production of cellular monolith bodies such as honeycombs. Cellular bodies find use in a number of applications such as catalytic, adsorption, electrically heated catalysts, filters such as diesel particulate filters, molten metal filters, regenerator cores, etc.

Generally honeycomb densities range from about 235 cells/cm$^2$ (1500 cells/in$^2$) to about 15 cells/cm$^2$ (100 cells/in$^2$) and wall thicknesses from 0.025 mm (1 mil) to about 0.5 mm (20 mils). Methods disclosed herein may be especially suited for extruding thin wall/high cell density honeycombs, such as honeycombs having wall thicknesses less than 0.1 mm (4 mils), including less than 0.075 mm (3 mils), and further less than 0.05 mm (2 mils).

The extrudates may then be dried and fired according to known techniques. The firing conditions of temperature and time may depend on the composition and size and geometry of the body, and embodiments herein are not limited to specific firing temperatures and times. For example, in compositions which are primarily for forming cordierite, the top firing temperatures may typically be from about 1300° C. to about 1450° C., and the holding times at these temperatures may be from about 1 hour to about 6 hours. For cordierite-mullite forming mixtures which yield the previously described cordierite-mullite compositions, the top firing temperatures may be from about 1375° C. to about 1425° C. Firing times depend on factors such as kinds and amounts of materials and nature of equipment but typical total firing times may be from about 20 hours to about 80 hours.

Prior to reaching the top firing temperature, the temperature of the firing environment is typically adjusted according to a predetermined firing schedule. Such firing schedules, in exemplary embodiments, includes those in which the temperature of the firing environment is increased from 400° C. to 500° C., which typically correlates to dehydroxylation of hydrous clay present in the green body. Such clay dehydroxylation influences shrinkage of the body, which can, in turn, influence whether the resulting ceramic article exhibits certain undesirable defects, such as cracks. For example, green bodies that exhibit a shrinkage upon firing between 400 and 500° C. of greater than 0.03% tend to be prone to cracking whereas green bodies that exhibit a shrinkage upon firing between 400 and 500° C. of less than 0.02% tend to be much less prone to cracking. Embodiments described herein can enable hydrous clay containing green bodies that exhibit a shrinkage upon firing between 400 and 500° C. of less than 0.02%.

The disclosure and scope of the appended claims will be further clarified by the following example.

Example

A series of green cordierite bodies were extruded from ceramic precursor batches. Each ceramic precursor batch included hydrous clay (12-20%) and cordierite forming raw ingredients such as talc, calcined clay, and alumina in appropriate formulation to yield stoichiometric cordierite in a fired body, as well as extrusion aides such as binders and lubricants. Water was added to the homogeneous mixture of the raw materials, producing a batch which was kneaded and extruded through a cellular honeycomb die.

Each green body had the same amount of each ingredient. The only difference between the batch ingredients was the crystallite size of the particle components of the hydrous clay, which ranged from between about 60 nanometers to about 100 nanometers and was measured using the X-ray powder diffraction method described previously.

Figure 2:
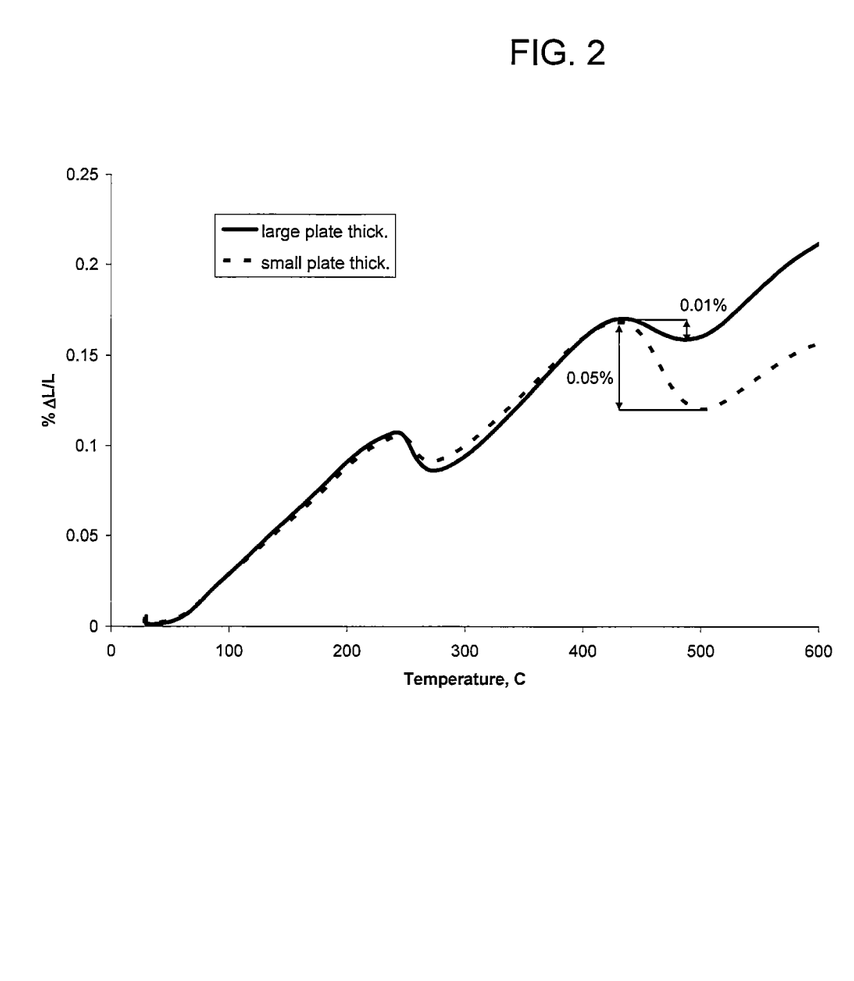
FIG. 2 plots dilatometer data used to determine material shrinkage over a temperature range.
Figure 3:
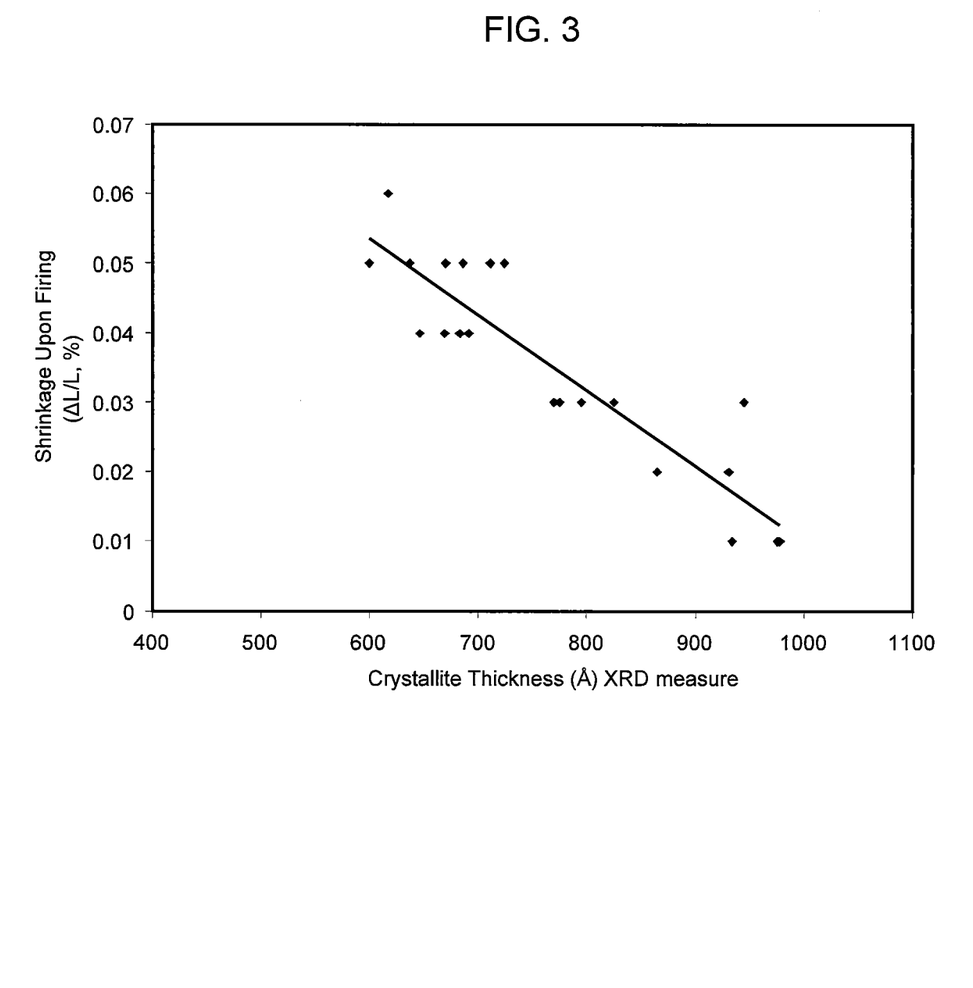
FIG. 3 plots shrinkage (between 400 and 500° C.) upon firing of a green body as a function of crystallite size of hydrous clay components having a platy geometry, which were used as batch components of the green body.

Following extrusion, the material was dried in an oven after which, a sample was cut from the dried material and was run in a dilatometer. Dilatometer data for exemplary samples with a range of crystallite sizes and corresponding CTEs is plotted in FIG. 2 as the % change in length (% $\Delta L/L$) as a function of temperature. The important part of the curve is in the 400-500° C. region. The change in % $\Delta L/L$ is recorded by taking the % $\Delta L/L$ of the peak (~410° C.) minus the % $\Delta L/L$ of the valley (~500° C.) as shown in FIG. 3.

Table 1 sets forth shrinkage upon firing of the green bodies between firing environment temperatures of between 400° C. and 500° C. as a function of crystallite size of particle components of the hydrous clay in each green body.

TABLE 1

| Crystallite Size (nanometers) | Shrink % (400-500° C.) |
|---|---|
| 60.0 | 0.05 |
| 61.7 | 0.06 |
| 63.7 | 0.05 |
| 64.6 | 0.04 |
| 66.9 | 0.04 |
| 67.0 | 0.05 |
| 68.3 | 0.04 |
| 68.6 | 0.05 |
| 69.1 | 0.04 |
| 71.1 | 0.05 |
| 72.4 | 0.05 |
| 77.0 | 0.03 |
| 77.5 | 0.03 |
| 79.5 | 0.03 |
| 82.5 | 0.03 |
| 86.5 | 0.02 |
| 93.1 | 0.02 |
| 93.4 | 0.01 |
| 94.5 | 0.03 |
| 97.6 | 0.01 |
| 97.8 | 0.01 |

FIG. 3 plots the data set forth in Table 1. As can be seen from FIG. 3, increasing crystallite size of hydrous clay particle components correlates well to decreasing shrinkage upon firing of the green bodies between firing environment temperatures of between 400° C. and 500° C. For example, when the crystallite size of hydrous clay particle components was greater than about 80 nanometers, the shrinkage of the green bodies upon firing between 400 and 500° C. was less than about 0.03%. When the crystallite size of hydrous clay particle components was greater than about 90 nanometers, the shrinkage of the green bodies upon firing between 400 and 500° C. was less than about 0.02%.

Figure 4A:
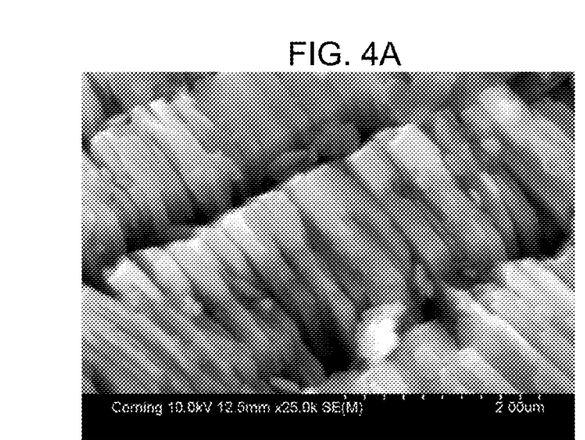
FIGS. 4A-D show field emission scanning electron microscopy (FESEM) images of hydrous clays having hydrous clay components of varying crystallite size.
Figure 4B:
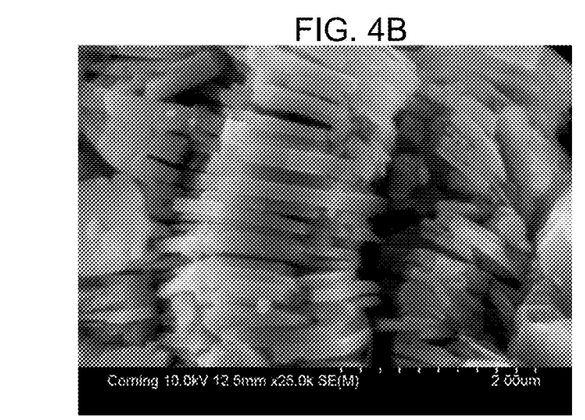
Figure 4C:
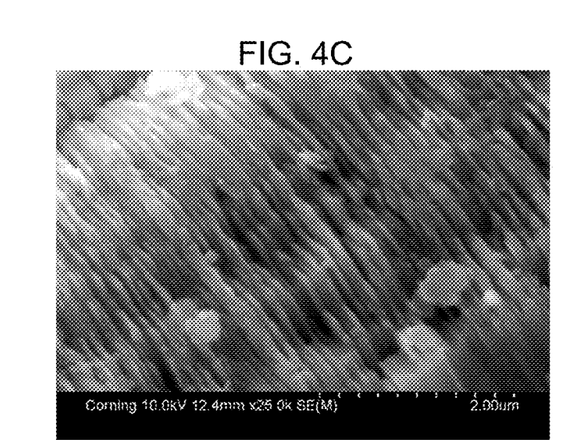
Figure 4D:
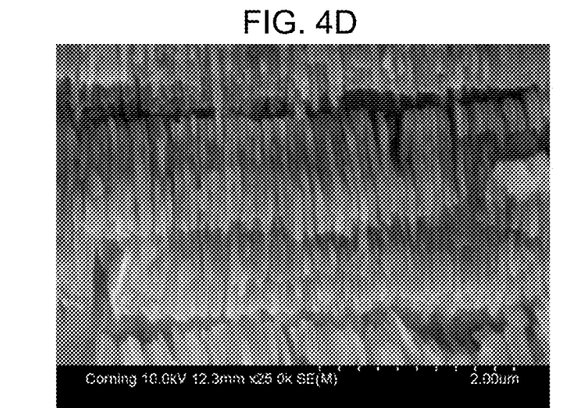

FIGS. 4A-D show SEM images of various hydrous clays, wherein FIGS. 4A-B show hydrous clays having relatively thicker particle components that are relatively less prone to cracking and FIGS. 4C-D show hydrous clays having relatively thinner particle components that are relatively more prone to cracking.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention as set forth in the appended claims. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A method of making a ceramic article, the method comprising:
   compounding ceramic precursor batch components, the ceramic precursor batch components comprising hydrous clay,
   wherein the hydrous clay comprises particle components having a platy geometry,
   wherein the crystallite size of the particle components having the platy geometry is greater than a predetermined amount,
   wherein the crystallite size of the particle components is the shortest dimension that the hydrous clay component extends in the basal plane direction and the crystallite size is greater than about 80 nanometers.

2. The method of claim 1, wherein the method further comprises determining the crystallite size of the particle components having the platy geometry prior to compounding hydrous clay with other ceramic precursor batch components.

3. The method of claim 2, wherein determining the crystallite size of the particle components having the platy geometry comprises using an x-ray diffraction technique.

4. The method of claim 2, wherein if the crystallite size of the particle components having the platy geometry is determined to be below a predetermined amount, the method further comprises compounding additional particle components having the platy geometry and a crystallite size that is some amount higher than the predetermined amount, such that, collectively, the particle components having the platy geometry have a crystallite size that is greater than a predetermined amount.

5. The method of claim 1, wherein the ceramic precursor batch components comprise at least 10% hydrous clay by weight.

6. The method of claim 1, wherein the crystallite size of the particle components having the platy geometry is between 80 and 150 nanometers.

7. The method of claim 1, wherein the ceramic precursor batch components comprise at least 15% hydrous clay by weight.

8. The method of claim 1, wherein the method further comprises extruding the compounded ceramic precursor batch components into a green body and firing the green body into a ceramic article.

9. The method of claim 8, wherein the green body exhibits a shrinkage upon firing between 400 and 500° C. of less than 0.02%.

10. A ceramic precursor batch composition, comprising:
    ceramic precursor batch components, the ceramic precursor batch components comprising hydrous clay,
    wherein the hydrous clay comprises particle components having a platy geometry, wherein the crystallite size of the particle components having the platy geometry is greater than a predetermined amount, wherein the crystallite size of the particle components is the shortest dimension that the hydrous clay component extends in the basal plane direction and the crystallite size is greater than about 80 nanometers.

11. The ceramic precursor batch composition of claim 10, wherein the ceramic precursor batch components comprise at least 10% hydrous clay by weight.

12. The ceramic precursor batch composition of claim 10, wherein the crystallite size of the particle components having the platy geometry is between 80 and 150 nanometers.

13. The ceramic precursor batch composition of claim 10, wherein the ceramic precursor batch components comprise at least 15% hydrous clay by weight.

14. A green cellular ceramic body, comprising:
ceramic precursor batch components, the ceramic precursor batch components comprising hydrous clay,
wherein the hydrous clay comprises particle components having a platy geometry,
wherein the crystallite size of the particle components having the platy geometry is greater than a predetermined amount,
wherein the crystallite size of the particle components is the shortest dimension that the hydrous clay component extends in the basal plane direction and the crystallite size is greater than about 80 nanometers.

15. The green cellular ceramic body of claim 14, wherein the ceramic precursor batch components comprise at least 10% hydrous clay by weight.

16. The green cellular ceramic body of claim 14, wherein the crystallite size of the particle components having the platy geometry is between 80 and 150 nanometers.

17. The green cellular ceramic body of claim 14, wherein the ceramic precursor batch components comprise at least 15% hydrous clay by weight.

\* \* \* \* \*